Patented Jan. 30, 1934

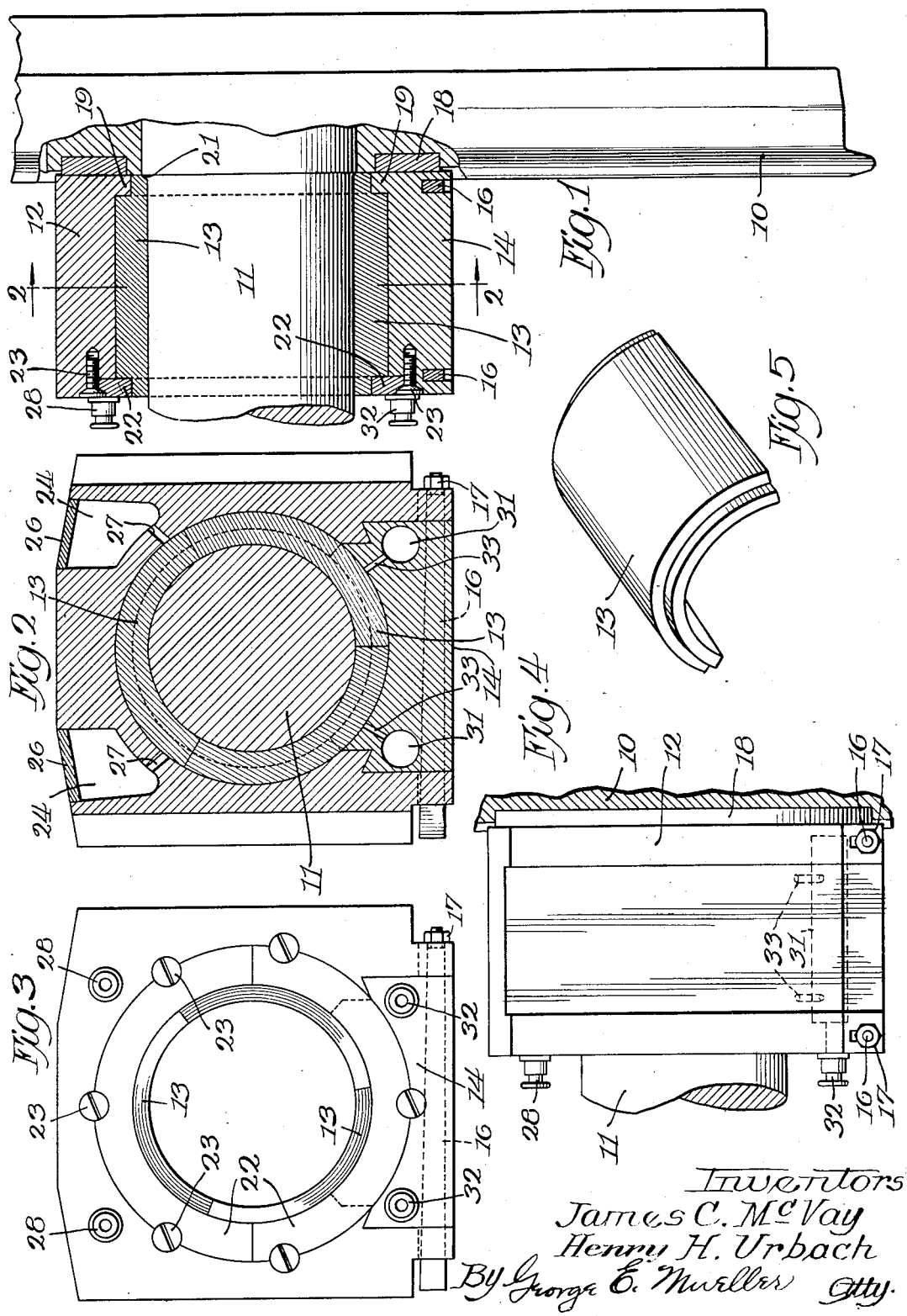

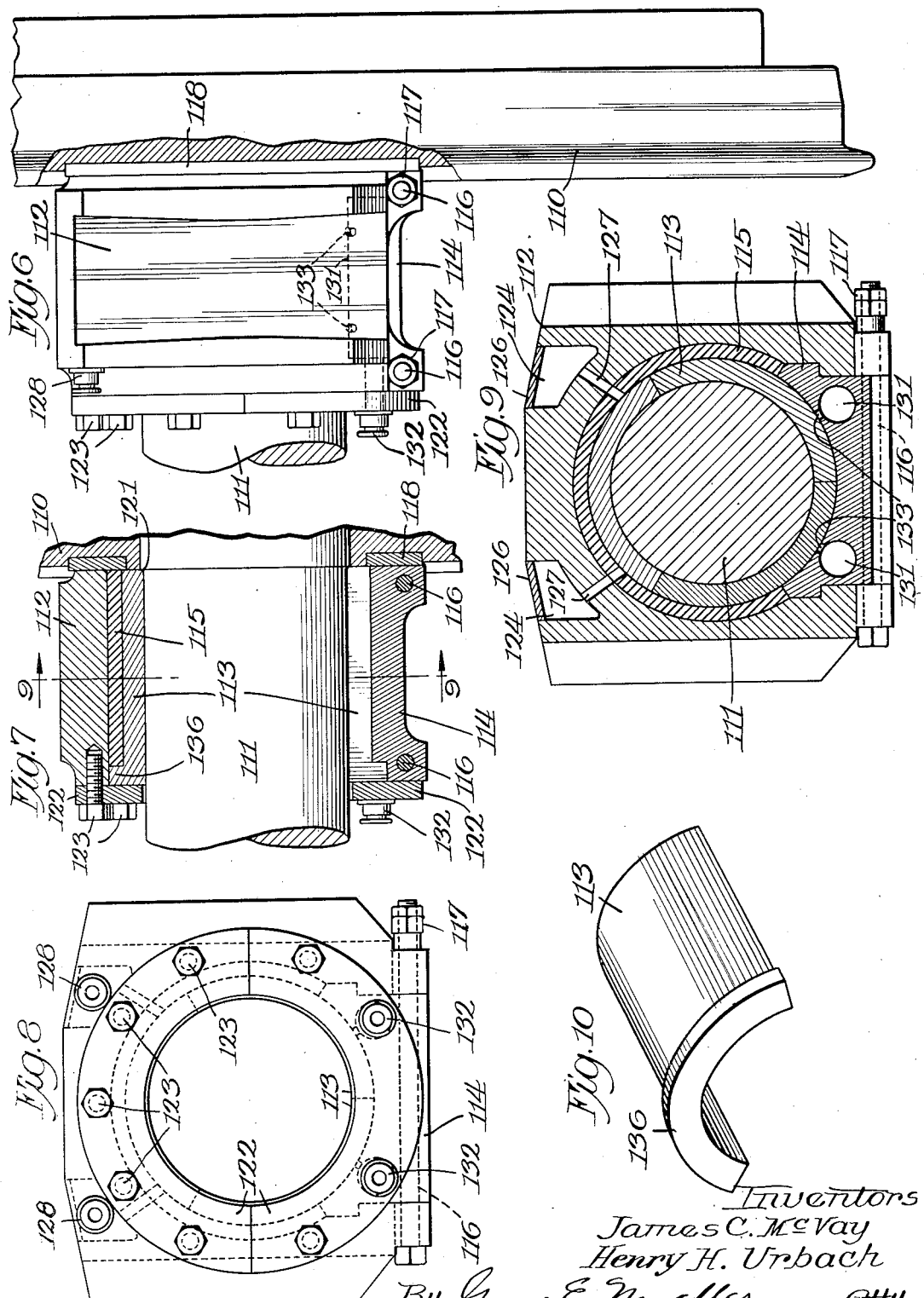

1,945,060

UNITED STATES PATENT OFFICE 1,945,060

FLOATING DRIVING BUSHING FOR LOCOMOTIVES

James C. McVay, Plattsmouth, and Henry H. Urbach, Lincoln, Nebr.

Application September 20, 1928
Serial No. 307,070

7 Claims. (Cl. 308—43)

Our invention relates in general to locomotives, and particularly to an improved journal box or bushing therefor for use on the locomotive driving wheels.

The principal object of our invention is the provision of an improved driving box.

Another object is the provision of a driving box which will run cooler than driving boxes heretofore in use.

Another object is the provision of a driving box having improved lubrication advantages.

Another object is the provision of a driving box adapted for securing greater mileage without requiring repair or replacement of parts.

Another object is the provision of a driving box wherein the bushings may be removed, changed or adjusted without dropping the driving wheels.

Another object is the provision of a driving box bushing of an improved type adapted for use with present standard types of driving boxes.

Other objects or features of our invention will be apparent from a consideration of the detailed description taken with the accompanying drawings wherein Fig. 1 is a fragmentary view partly in section showing a form which the driving box of our invention may take;

Fig. 2 is a sectional view taken along the line 2—2 of Fig. 1;

Fig. 3 is a view looking at the face of the driving box with the axle removed;

Fig. 4 is a fragmentary side elevational view;

Fig. 5 is a perspective of one section of the bushing employed in this type of driving box;

Fig. 6 is a fragmentary, elevational view partially in section showing a slightly modified form of our invention;

Fig. 7 is a vertical central section thereof;

Fig. 8 is a face view of the driving box with the axle removed;

Fig. 9 is a sectional view taken along the line 9—9 of Fig. 7 and

Fig. 10 is a perspective view of a section of the bushing employed in this form of the invention.

While we have no preference for either form of the invention shown, since each is particularly adapted for use with some particular type of locomotive, the form shown in Figs. 1 to 5 will first be described. It is obvious of course that in adapting the invention to other locomotives certain details in structure may be changed, but this may be done without departing from the spirit and scope of the invention. The invention as previously indicated has to do with the bearing or journal box in which the large locomotive driving wheels are journaled. These wheels comprise the usual track riding wheels 10 with an axle 11 connecting each pair of wheels, and the wheels are provided with crank pins (not shown) which are engaged by the usual connecting rods (not shown) by means of which the wheels and incidentally the locomotive are driven.

In the driving box of our invention we provide a journal box 12 within which a three part floating bushing 13 is journaled. This floating bushing surrounds the axle 11 and a filler block 14 is held by wedge bolts 16 and nuts 17 so as to adjustably support the filler block in the journal box in the manner shown. The filler block is adjusted so that the floating bushing is held tightly in the journal box; it should not be bound, and the dimensions of the floating bushing are controlled so that with the filler block adjusted to the proper position a snug but sliding fit results both between the axle and floating bushing and between the floating bushing and the outside of the journal. The floating bushing is formed in three parts to facilitate applying it in position.

In order to avoid all thrust movement of the parts we employ a bearing ring 18 imbedded in the wheel as shown and this lies up against the inside end of the journal box housing. In addition the journal box has an internal flange 19 extending into a cut away portion of the floating bushing and the floating bushing is finished so as to fit a slight bevel formed at 21 in the axle. The floating bushing is partly cut away at the outer end thereof as well as the face of the journal box, and a cover plate 22 is fitted into the resulting opening and held in place by machine screws 23. By this means any thrust movement of the floating bushing with respect to the journal box housing, or of the driving box with respect to the axle is cut down to a minimum. Of course the same construction is employed at the opposite end of the axle.

One of the principal features of our invention is improved lubrication. The top of the journal box housing is provided with a pair of wells 24 fitted with closure plates 26 which are preferably welded into position. These wells serve as grease reservoirs and have connected thereto at the bottom grease ducts 27 which extend through the housing body and connect to the inside thereof to supply lubrication to the floating bushing. The wells are provided with valve control feeding nipples 28 which are preferably of the type known as alemite fittings, being designed so that grease under pressure may be forced through the wells into intimate contact with the bushings, and when such pressure is relieved an adequate supply of grease will be left in the wells for subsequent gravity feed.

Similarly at the lower portion of the driving box we provide additional lubricating means shown in the form of reservoirs 31 formed in the filler block, these reservoirs being supplied through alemite nipples 32 and provided with ducts 33 leading to the bushing. In this manner adequate lubrication is supplied to the floating bushing, and the lubricant on account of the character and formation of the floating bushing will readily spread to both sides thereof so that a film of grease is maintained throughout the entire surface of the three bushing parts. While the bearing ring 18 does not carry the load that is borne by the floating bushing, and consequently does not require anything like the same amount of lubrication, still the arrangement is such that a modicum of grease will flow between the ring 18 and the driving box housing to prevent undue wear and overheating at this point.

In the form of the invention shown in Figs. 6 to 10 inclusive the principal difference is one of structure, although there is an additional feature in the form of a stationary bushing contacting with the floating bushing which will be pointed out. In this form the driving wheel 110 has the usual axle 111 with the driving box housing 112. The floating bushing 113 is held in position by a filler block 114, and a stationary bushing 115 also surrounds the floating bushing in the manner shown. Instead of the wedge bolts shown in the preceding embodiment standard bolts 116 are employed held by suitable nuts 117. The bearing ring 118 is substantially the same as shown in the previous figures.

It is therefore obvious that the floating bushing in this embodiment is relatively thin, its place being taken partly by the stationary bushing 115 and by the filler block 114 extending up farther and forming with the stationary bushing a continuing smooth cylindrical surface for the revolving of the floating bushing. We prefer to weld the ends of the stationary bushing to the driving box housing to avoid any possibility of its shifting.

The manner of supporting the floating bushing in position is somewhat different than shown in the previous form since no thrust surfaces are employed on the inside of the driving wheel of the driving box with the exception of the bevel edge 121 of the axle and of course the bearing ring 118. The driving box stationary bushing and movable bushing are all substantially straight and unprovided with interlocking flanges or the like. At the front end, however, the floating bushing is provided with an outwardly extending annular flange 136 which flange extends into contact with the inside surface of the driving box housing and is engaged between the shortened end of the stationary housing 115 and the cover plate 122. This cover plate is secured to the driving box housing by cap screws 123.

For lubricating this driving box we provide grease reservoirs in the form of wells in the housing, which wells are covered by plates 126 which are welded into position. Grease ducts 127 extend through the housing and stationary bushing to bring grease into contact with the floating bushing. Pressure gun fittings 121 are employed to supply lubricant under pressure through the reservoirs and ducts to the floating bushing, and the reservoirs retain a body of this grease to be fed down gradually during running. Similarly reservoirs 131 are provided in the filler block, these reservoirs being supplied with grease through fittings 132 and being provided with grease ducts 133 leading to the lower portion of the floating bushing.

In employing our invention a locomotive may have its driving boxes rebushed without making it necessary or even advisable to drop the wheels. The three section floating bushing is very easily placed around the axle and is changed simply by removing the cover plate and releasing the filler block. In use a driving box of this character will run a great deal cooler, will provide better lubrication and function in every respect in a way much superior to old style driving boxes. The lubricant is applied much more easily and economically and increased mileage is obtained.

While we have described two specific forms of our invention it is obvious that we do not necessarily restrict ourselves to the particular designs shown, the invention being limited only by the scope of the appended claims.

What we claim as new and desire to protect by Letters Patent of the United States is:

1. In a locomotive driving box a driving box housing open at the bottom to receive a driving wheel axle, a filler block secured in the opening to extend the housing entirely around the axle, a plural part bushing extending entirely around the axle and free to rotate with respect to both the housing and axle and a stationary bushing secured to the housing and extending to the filler block at each end, said stationary bushing being in contact with the plural part bushing throughout its inside face, and said plural part bushing being movable rotatably with respect to the stationary bushing.

2. In a locomotive driving box a driving box housing open at the bottom to receive a driving wheel axle, a filler block secured in the opening to extend the housing entirely around the axle, a plural part bushing extending entirely around the axle and free to rotate with respect to both the housing and axle and a stationary bushing secured to the housing and extending to the filler block at each end, said stationary bushing being in contact with the plural part bushing throughout its inside face, and said plural part bushing being movable rotatably with respect to the stationary bushing, the plural part bushing and filler block being provided with interlocking conformations to prevent longitudinal shifting of the bushing with respect thereto.

3. In a locomotive driving box a driving box housing open at the bottom to receive a driving wheel axle, a filler block secured in the opening to extend the housing entirely around the axle, a plural part bushing extending entirely around the axle and free to rotate with respect to both the housing and axle and a stationary bushing secured to the housing and extending to the filler block at each end, said stationary bushing being in contact with the plural part bushing throughout its inside face, and said plural part bushing being movable rotatably with respect to the stationary bushing, and a cover plate secured to the housing and filler block for supporting the plural part bushing therein.

4. In a locomotive driving box, a driving box housing open at the bottom to receive a driving wheel axle, a filler block secured in the opening to extend the housing entirely around the axle, a fixed bushing in the housing, and an end plate for said housing forming a groove with the end of said fixed bushing, and a rotatably mounted bushing having a flange extending into said groove to prevent longitudinal movement of said movable bushing.

5. In a locomotive driving box, a housing open at the bottom to receive a driving wheel axle, a stationary bushing in said housing extending over the upper and lateral sides of the axle, a filler block forming an extension of said stationary bushing and completing the inner cylindrical surface thereof, and a plural part floating bushing, the parts thereof having a greater peripheral length than the inner bearing surface of the filler block whereby the parts of said floating bushing may not be removed through said filler block opening but may be removed longitudinally without disturbing the stationary bushing or dropping the axle from the housing.

6. In a locomotive driving box, a housing open at the bottom to receive a driving wheel axle, said housing extending around substantially two-thirds of the periphery of the axle over the top and sides of the axle, a three-part floating bushing in said housing extending around the axle, and a filler block complementary to said housing engaging the remaining lower portion of the floating bushing.

7. In a locomotive driving box, a housing having an opening at the bottom large enough to pass a driving wheel axle, a filler block having a longitudinally slidable connection with the housing to close said opening, means for holding the filler block in position, said sliding connection preventing said holding means from assuming the full load of said filler block, an annular shoulder at one side of the housing and filler block, a plural part floating bushing disposed between the housing and filler block, and the axle, an end plate co-operating with said shoulder for holding the bushing in position, and means for continuously supplying lubricant to said bushing.

JAMES C. McVAY.
HENRY H. URBACH.